United States Patent
Tsai

(10) Patent No.: US 10,790,868 B1
(45) Date of Patent: Sep. 29, 2020

(54) CLIP FOR MOBILE DEVICE

(71) Applicant: LENNTEK CORPORATION, Torrance, CA (US)

(72) Inventor: Danny M. Tsai, Torrance, CA (US)

(73) Assignee: LENNTEK CORPORATION, Torrance, CA (US)

( * ) Notice: Subject to any disclaimer, the term of this patent is extended or adjusted under 35 U.S.C. 154(b) by 0 days.

(21) Appl. No.: 16/404,277

(22) Filed: May 6, 2019

(51) Int. Cl.
*A45F 5/00* (2006.01)
*H04B 1/3888* (2015.01)

(52) U.S. Cl.
CPC ...... *H04B 1/3888* (2013.01); *A45F 2005/006* (2013.01)

(58) Field of Classification Search
CPC ......... H04B 1/3888; H04B 2001/3861; H04M 1/385; H04M 1/04; H04M 1/185; A45F 2005/006
See application file for complete search history.

(56) References Cited

U.S. PATENT DOCUMENTS

| | | | | |
|---|---|---|---|---|
| 8,439,191 B1* | 5/2013 | Lu | ........................ | H04B 1/3888 206/320 |
| 8,567,832 B2* | 10/2013 | Kannaka | .................. | A45F 5/00 224/218 |
| 8,706,176 B1* | 4/2014 | Jia | ........................ | H04M 1/185 206/305 |
| 2012/0217275 A1* | 8/2012 | Yu | ............................. | A45F 5/00 224/267 |
| 2015/0305480 A1* | 10/2015 | Brousseau | ............... | B25G 3/00 224/267 |
| 2016/0049983 A1* | 2/2016 | Ripka | ..................... | H04M 1/04 455/575.6 |
| 2016/0344437 A1* | 11/2016 | Gordon | ................ | H04B 1/3888 |
| 2018/0220782 A1* | 8/2018 | Mody | ........................ | A45F 5/00 |
| 2018/0294830 A1* | 10/2018 | Osmanski | ............... | A45C 11/00 |
| 2019/0379775 A1* | 12/2019 | Nielsen | .................... | H04M 1/04 |
| 2020/0076937 A1* | 3/2020 | Ackerman | ........... | H04B 1/3888 |
| 2020/0099413 A1* | 3/2020 | Kim | ...................... | H04B 1/3888 |

* cited by examiner

*Primary Examiner* — Corey N Skurdal
(74) *Attorney, Agent, or Firm* — Fitzgerald IP Law; John K Fitzgerald, Esq.

(57) ABSTRACT

A clip for use with a mobile device is described. The clip mounts between a mobile device and a protective cover, and is used to attach various accessories to mobile device when the mobile and clip are inserted into the protective cover.

10 Claims, 4 Drawing Sheets

FIG. 6
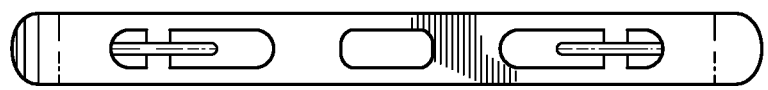
FIG. 7
FIG. 8
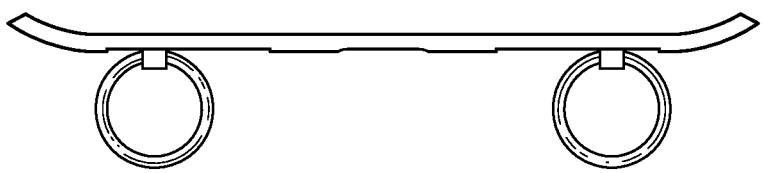
FIG. 9
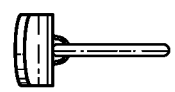  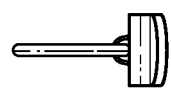
FIG. 10   FIG. 11

CLIP FOR MOBILE DEVICE

FIELD

The present disclosure generally relates to a clip for use with a mobile phone. More specifically, the present disclosure is directed to a clip that is configured to be placed between a mobile phone and a case Assembly disposed around a portion of the mobile phone to protect the surface of the mobile phone.

BACKGROUND

Protective covers are often used to protect at least some of the surfaces of a mobile device, such as, for example, but not limited to, a mobile telephone. These protective covers are removable, but often are mounted onto the mobile device and then left in place for an extended time. Since most mobile devices have charging ports, speakers, or other components disposed on a bottom edge of the or bezel area of the mobile device, a protective cover typically has at least one opening formed in a corresponding bottom side of the protective cover.

As mobile devices have grown in popularity, users have identified a need to be able to attach various items, such as lanyards, key chains, and the like, to their mobile devices so as to make them easier to hold, or to attach the above items or similar items to the mobile device. Not only can this improve usability of the mobile device, but since most users keep their mobile device close at hand, if not in their hand, they are always able to find the associated items.

SUMMARY OF THE INVENTION

In its most general aspect, the disclosure provides a clip configured to be held in place between a bottom side portion of a mobile device and a corresponding bottom side portion of a protective cover applied to the mobile device. In its broadest aspect, when the clip is mounted between the mobile device and the protective cover, the clip has at least one fixture that is configured to extend through a corresponding hole or slot in the bottom side portion of the protective cover. Various components such as a ring or other structure may be attached to the fixture, providing a way to attach various item to the mobile device in a semi-permanent manner.

In another general aspect, the disclosure provides a clip for use with a mobile device inserted into a protective cover, comprising a body portion that may be sized and configured to fit adjacent a side of a mobile device, a first slot formed in a central portion of the body portion, the first slot which is positioned to allow access to a port of the mobile device when the body portion is disposed between the mobile device and the protective cover, a second slot formed in a peripheral portion of the body portion, and a fixture disposed at the second slot, the fixture having a protruding portion configured to extend through an opening in the protective cover when the body portion is disposed between the mobile device and the protective cover mounted to the mobile device, the protruding portion having a distal end with an opening disposed thereat.

In another aspect, the clip may further include an attachment member configured to removably and movably engage the opening at the distal end of the protruding portion of the fixture. In yet another aspect, the attachment member may be ring-shaped.

In still another aspect, the clip may include a third slot formed in an opposite peripheral portion of the body portion.

In another aspect, the disclosure provides a method for providing an attachment point for a mobile device, including providing a protective cover which may have an interior sized to receive the mobile device, the protective cover including a central access slot and a peripheral access slot; positioning a clip including an attachment fixture having a protruding portion and a central slot within an interior of the protective cover so that at least a portion of the protruding portion extends through the peripheral access slot of the protective cover, such that the central slot of the clip is aligned with the central access of the protective cover, and inserting the mobile device into the protective cover so that the central access slot of the protective cover and the central slot of the clip align with the port of the mobile device.

In one alternative aspect, the clip is first positioned adjacent an end of the mobile device having the port such that the central slot of the clip is aligned with the port of the mobile device, and then the mobile device and the clip are inserted into the interior of the protective cover such that the center slot of the clip and the port are aligned with the central access slot of the protective cover and the protruding portion of the fixture extends through the peripheral access slot of the protective cover.

In another alternative, an attachment element may be removably and movably engaged with a distal end of the protruding portion of the attachment fixture after insertion of the mobile device into the protective device. In one alternative aspect, the attachment element may be a ring or any other structure that will allow an accessory to be attached to the protruding portion, such a strap, lanyard, and the like.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 6 is a rear view of the clip of FIG. 4.
FIG. 7 is a frontal view of the clip of FIG. 4.
FIG. 8 is a top view of the clip of FIG. 4.
FIG. 9 is a bottom view of the clip of FIG. 4.
FIG. 10 is a left view of the clip of FIG. 4.
FIG. 11 is a right view of the clip of FIG. 4.

DETAILED DESCRIPTION OF THE PREFERRED EMBODIMENTS

Figure 1:
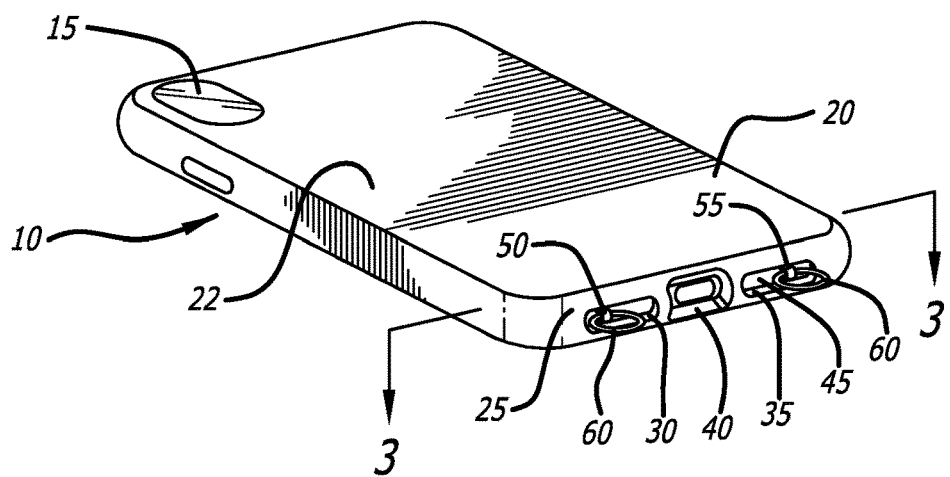
FIG. 1 is a perspective view of a rear side, right edge, and bottom edge of a mobile device showing a protective case installed on the mobile device, and also showing a clip in accordance with an embodiment of the disclosure mounted between the bottom side of the mobile device and the bottom side of the protective cover.

Selected embodiments of the present disclosure will now be explained with reference to the drawings. It will be apparent to those skilled in the art from this disclosure that the following descriptions of the embodiments of the present disclosure are provided for illustration only and not for the purpose of limiting the disclosure as defined by the appended claims and their equivalents.

As will be described hereinafter in greater detail, the various embodiments of the present disclosure relates to a system for providing for attachment of various items in a removable fashion to mobile devices by using various embodiments of a clip that may be installed between the mobile device and a protective cover.

For purposes of explanation, specific nomenclature is set forth to provide a thorough understanding of the present disclosure. Description of specific applications and methods are provided only as examples. Various modifications to the embodiments will be readily apparent to those skilled in the art and the general principles defined herein may be applied to other embodiments and applications without departing from the spirit and scope of the disclosure. Thus the present disclosure is not intended to be limited to the embodiment shown, but is to be accorded the widest scope consistent with the principles and steps disclosed herein.

In the following description, numerous specific details are set forth in order to provide a thorough understanding of the present disclosure. It will be apparent, however, to one of ordinary skill in the art, that the present invention may be practiced without the specific oh details. In other instances, well-known components or methods have not been described in detail but rather in a block diagram, or a schematic, in order to avoid unnecessarily obscuring the present disclosure. For the purposes of clarity, reference numerals pointing out specific structural elements that remain consistent across the various figures are used.

Referring now to the drawings in detail, in which like reference numerals indicate like or corresponding elements among the several figures, there is shown in FIG. 1 a perspective view showing a rear side, right side, and bottom side of an embodiment of the present disclosure that shows an assembly 10 of a mobile device 15 disposed within a protective covering 20. Protective covering 20 has a rear side 22 and a bottom side 25. Holes or slots 30, 35 in the protective covering allow sound generated by the mobile device to escape through the protective cover so that the sounds may be heard by a user.

The bottom of the protective case also includes another hole or slot to allow access to a charging port or other connection port of the mobile device encased within the protective covering. Also shown in FIG. 1 are portions of an embodiment of a clip 45 mounted between a bottom side of mobile device 15 and bottom side 25 of the protective covering. As shown in this figure, attachment elements or rings 60 may be removably mounted to fixtures 50 and 55 of clip 45. While attachment elements or rings are shown as rings, one of ordinary skill in the art will understand that the attachment could be any structure or accessory that is configured to allow removable and/or moveable attachment to fixtures 50 and 55.

Figure 2:
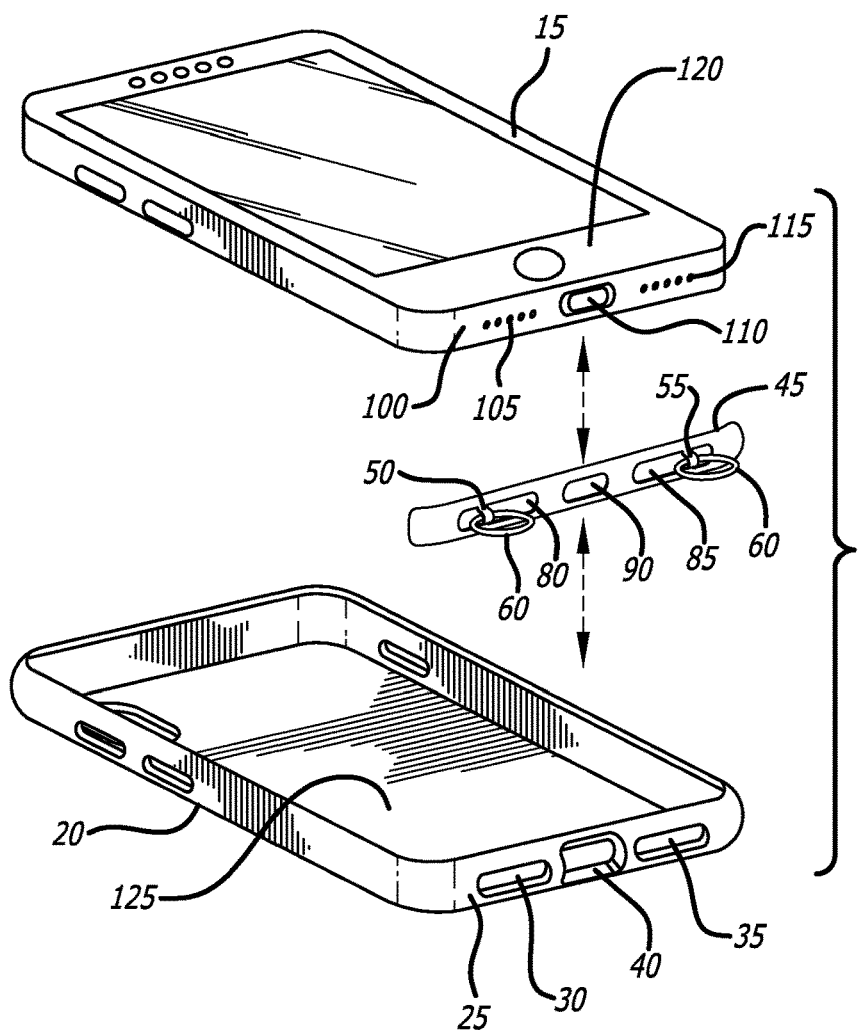
FIG. 2 is perspective exploded view of the mobile device, protective cover, and clip of embodiment of FIG. 1 showing a top side, a bottom side, and a left edge of the mobile device, a bottom side, left side, and portions of an interior of the protective case, and front side of the clip, of the embodiment of FIG. 1.

FIG. 2 is an exploded perspective view of the embodiment of FIG. 1 described above. In this figure, however, the assembly has been turned front side up. Mobile device 15 has a front face 120 that is typically visible to a user of the device. Also shown is a bottom side 100 of the mobile device, the bottom side 100 having speaker holes 105, 115, as well as a port 110 for connecting the mobile device to a charger or other accessory. Mobile device 15 may be any electronic device, such as a smart phone, iPhone, iPad, Android, BlackBerry, and the like.

Also visible in FIG. 2 is a view of protective cover 20 showing holes or slots 30, 35, and 40 disposed on a bottom side 25 of the protective cover, as well as portions of the interior 125 of protective cover 20. It will be apparent to one of ordinary skill in the art from this disclosure that the protective cover may be individualized to a particular mobile device by sizing the protective cover appropriately, so that the mobile device can be inserted within the protective cover in a close-fitting arrangement so that the mobile device is maintained within the protective cover while being used, stored, or transported.

Referring again to FIG. 2, additional detail of clip 45 is shown. In this embodiment, clip 45 has holes or slots 80, 85, and 90 that are typically sized and located to correspond to speaker holes 105, 115 and port one 110 of the mobile device 15. One of ordinary skill in the art will immediately appreciated that the location of holes or slots 80, 85 and 90 may be located within clip 45 determining on the type and size of the mobile device that clip 45 is to be used with. It will also be apparent that more than the holes or slots shown in FIG. 2 may be included in clip 45 without departing from the scope of the intended disclosure.

In the embodiment shown, fixtures 50, 55 are disposed within holes or slots 80, 60 respectively. Fixtures 50 and 55 may be formed in a number of ways. In the embodiment shown, fixtures 50 and 55 are shown as raised portions of clip 45. As one of ordinary skill in the art will readily understand, clip 45 may be formed from a single piece of metal or plastic. Where clip 45 is fashioned from an appropriate thin piece of metal, it may be produced through a stamping process or other known process to form the body, holes or slots, of the clip 45, but also stretches appropriate portions of the body of clip 45 to form fixtures 50 and 55. In other embodiments, clip 45 may be formed from a another material, such as, for example, a thermoplastic or thermosetting material. While fixtures 50 and 55 are shown as extending above the plane of the front of the clip 45, the extension distance may be varied depending on the design of the clip to the extent the clip is modified to accommodate a particular mobile device without departing from the intended scope of the disclosure. Additionally, clip 45 may be decorated in various ways, and may also be manufactured in various colors.

Figure 3:
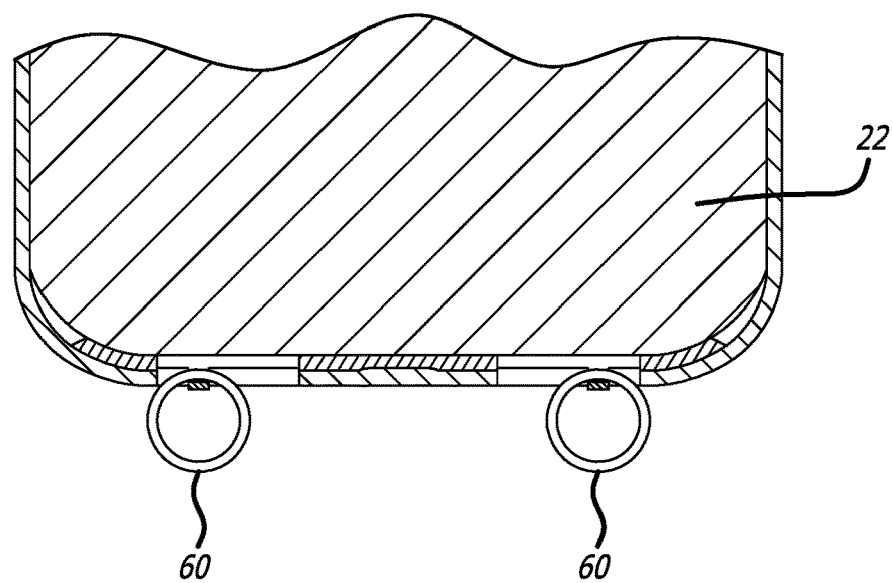
FIG. 3 is a partial enlarged rear view of the protective cover showing rings attached to fixtures of the clip of FIG. 1 extending through holes in the bottom side of the protective cover.
Figure 4:
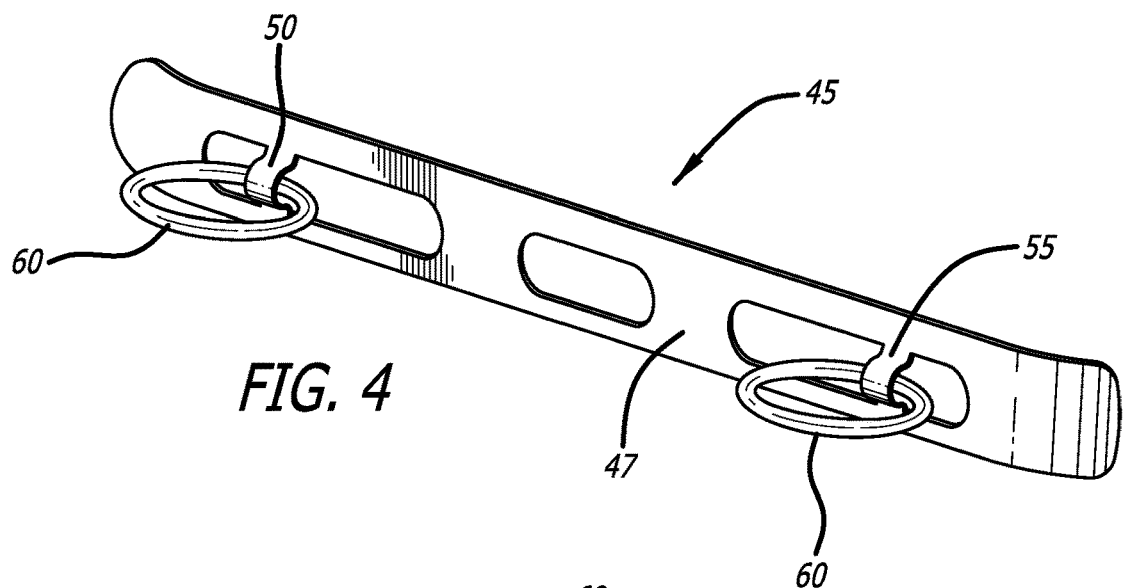
FIG. 4 is a front perspective view of an embodiment of a clip in accordance with the disclosure.
Figure 5:
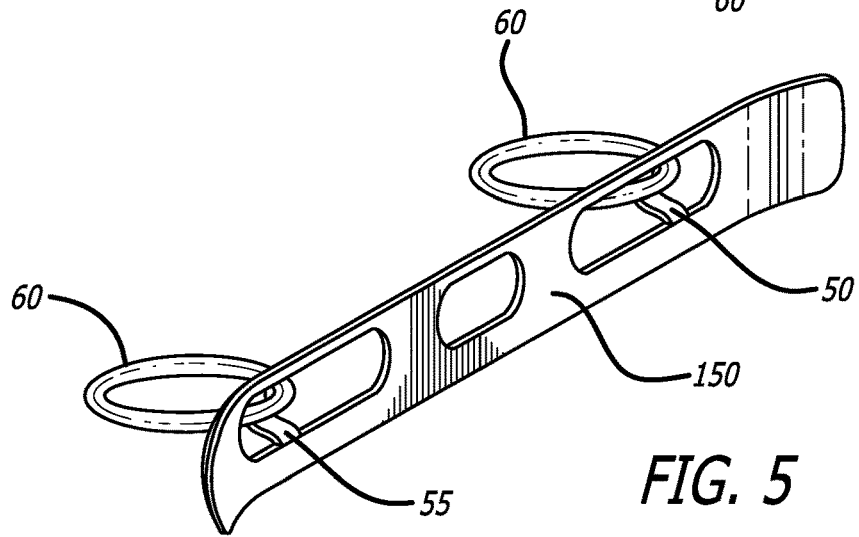
FIG. 5 is a rear perspective view of the clip of FIG. 4.

As illustrated in FIGS. 1 and 2, various accessories may be attached to fixtures 50, 55 in a manner that allows them to extend through the holes or slots formed in the bottom side the protective cover 20. FIG. 3, which is an enlarged partially cut away rear view of the assembly of FIG. 1, illustrates how rings 60 our removably attached to the fixtures of clip 45 so that they extend through the holes or slots of the protective cover 20. One of ordinary skill in the art will understand that, while rings 60 are shown, any article that is capable of being fastened to the fixtures can be used.

FIGS. 4-11 further depict various views of the clip 45. For example, FIGS. 6 and 7 illustrate frontal and rear views of clip 45. Similarly, FIGS. 8-11 depict right, left, top and bottom views of clip 45. It is clearly seen in these views that the fixtures of clip 45 extend from the front surface of clip 45 so that they can extend through corresponding slots or holes of a protective cover.

Figure 12:
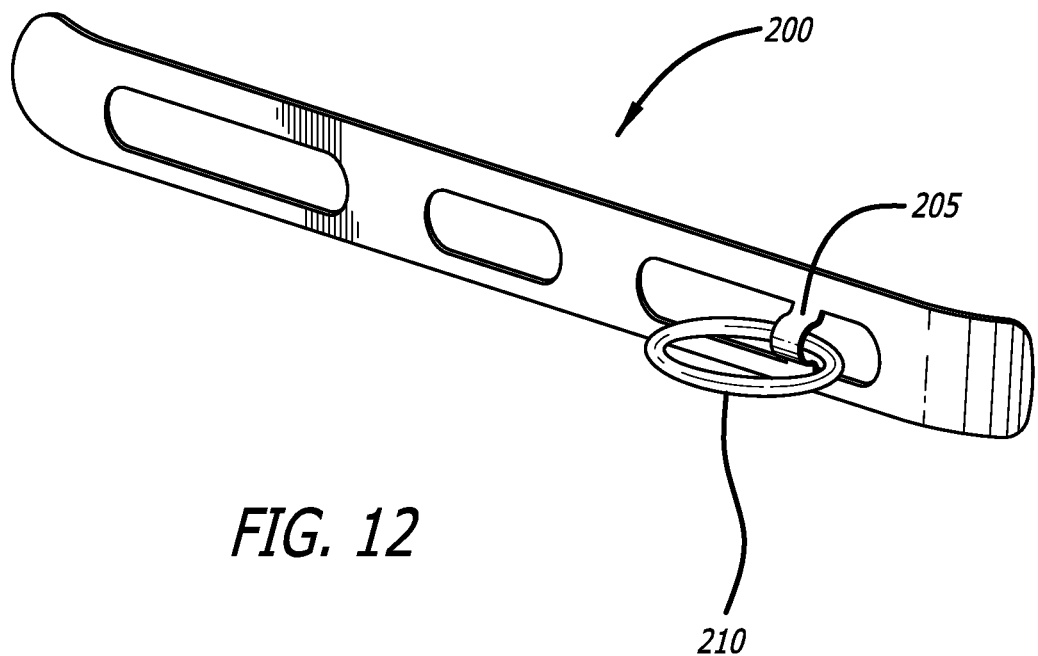
FIG. 12 is perspective frontal view of another embodiment in accordance with the disclosure.

FIG. 12 illustrates another embodiment of a clip 200. In this embodiment, a single fixture 205 is shown. Ring 210 removably attaches to fixture 205.

The various embodiments described herein are advantageous in that they provide an inexpensive and easily installed way to provide for attachment of various mobile device accessories to a mobile device. For example, use of a clip such as is illustrated by the various embodiments of the disclosure allows for attachment of an accessory, such as a lanyard, strap, belt, hook, and the like, to the mobile device and protective cover assembly. Normally, an attachment point would be required to have been formed on the protective cover itself which could increase the thickness of the cover, or protrude from the cover, interfering with placing the covered mobile device into a user's pocket, briefcase or purse, potentially causing the covered mobile device to snag on the pocket or briefcase or purse. Insertion of the covered mobile device into a tightly fitting pocket may result in discomfort being experienced by the user. Using the disclosed clip prevents these problems from arising.

In understanding the scope of the disclosure, the term "comprising" and its derivatives, are intended to be open ended terms that specified the presence of the stated features, elements, components, groups and/or steps, but do not in exclude the presence of other unstated features, elements, components, groups and/or steps. The foregoing also applies to words having similar meaning such as, the terms including, having, and their derivatives. Also, the terms part, section, portion, member, or element, when used in the singular case can have the dual meaning of a single part for a plurality of parts. Further, terms of degree, such as substantially, about, and approximately, as used herein, mean a reasonable amount of deviation of the modified term such that the end result is not significantly changed.

Although the disclosed clip system has been described hereabove with reference to certain examples or embodiments, various additions, deletions, alterations and modifications may be made to those described examples and embodiments without departing from the intended spirit and scope of the clip system. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any embodiment or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims. The disclosure is limited only by the scope of the appended claims.

I claim:

1. A clip for use with a mobile device inserted into a protective cover, comprising:
    a body portion being sized and configured to fit adjacent a side of a mobile device;
    a first slot formed in a central portion of the body portion, the first slot positioned to allow access to a port of the mobile device when the body portion is disposed between the mobile device and the protective cover;
    a second slot formed in a peripheral portion of the body portion; and
    a U-shaped fixture disposed at the second slot, the U-shaped fixture having a protruding portion configured to extend through an opening in the protective cover when the body portion is disposed between the mobile device and the protective cover mounted to the mobile device.

2. The clip of claim 1, further comprising an attachment member configured to removably and movably engage the protruding portion of the U-shaped fixture.

3. The clip of claim 2, wherein the attachment member is ring-shaped.

4. The clip of claim 1, further comprising a third slot formed in an opposite peripheral portion of the body portion.

5. A method for providing an attachment point for a mobile device, comprising:
    providing a protective cover with an interior sized to receive the mobile device, the protective cover having a central access slot and a peripheral access slot;
    positioning a clip including an attachment fixture having a protruding portion and a central slot within an interior of the protective cover so that at least a portion of the protruding portion extends through the peripheral access slot of the protective cover, and the central slot of the clip is aligned with the central access of the protective cover; and
    inserting the mobile device into the protective cover so that the central access slot of the protective cover and the central slot of the clip align with the port of the mobile device.

6. The method of claim 5, wherein the clip is first positioned adjacent an end of the mobile device having the port such that the central slot of the clip is aligned with the port of the mobile device, and then the mobile device and the clip are inserted into the interior of the protective cover such that the center slot of the clip and the port are aligned with the central access slot of the protective cover and the protruding portion of the fixture extends through the peripheral access slot of the protective cover.

7. The method of claim 5, further comprising removably and movably engaging an attachment element to a distal end of the protruding portion of the attachment fixture after insertion of the mobile device into the protective device.

8. The method of claim 6, further comprising removably and movably engaging an attachment element to a distal end of the protruding portion of the attachment fixture after insertion of the mobile device into the protective device.

9. The method of claim 7, wherein the attachment element is a ring.

10. The method of claim 7, wherein the attachment is a lanyard.

* * * * *